Nov. 3, 1964    A. E. ANDERSON ETAL    3,155,157
TEMPERATURE STABILIZED CHAMBER UTILIZING THERMOELECTRIC COOLING
Filed Aug. 9, 1962    3 Sheets-Sheet 1

INVENTORS
Albert E. Anderson
William R. Stubstad
BY
Moody and Harris
Attorneys

Nov. 3, 1964  A. E. ANDERSON ETAL  3,155,157
TEMPERATURE STABILIZED CHAMBER UTILIZING THERMOELECTRIC COOLING
Filed Aug. 9, 1962  3 Sheets-Sheet 2

INVENTORS
Albert E. Anderson
William R. Stubstad
BY
Moody and Harris
Attorneys

United States Patent Office 3,155,157
Patented Nov. 3, 1964

3,155,157
TEMPERATURE STABILIZED CHAMBER UTILIZING THERMOELECTRIC COOLING
Albert E. Anderson, Cedar Rapids, and William R. Stubstad, Marion, Iowa, assignors to Collins Radio Company, Cedar Rapids, Iowa, a corporation of Iowa
Filed Aug. 9, 1962, Ser. No. 215,935
2 Claims. (Cl. 165—30)

This invention relates to a temperature stabilized chamber and more particularly to a multichamber device that may be accurately maintained at a constant predetermined temperature either above or below environmental temperatures.

It is often necessary to provide a chamber that is temperature stablized and this is particularly true in utilization of some electronic equipments. Such a chamber is often required, for example, to maintain the crystal of a crystal oscillator at constant temperature, since deviation in temperature affects the output frequency of the oscillator, as is well known in the art.

The amount of control needed to maintain operation of an equipment within prescribed limits varies, of course, with the amount of permissible error. If relatively wide tolerances are established for a crystal oscillator, for example, little, or possibly no, temperature control is necessary. However, as the need arises to maintain the frequency within more stringent limits, temperature must be more critically controlled.

One of the better expedients for providing temperature control, has been through the use of a stabilizing chamber, or oven. Where the temperature need only be controlled within about plus or minus one degree centigrade per one hundred degree centigrade temperature change, a single stage chamber, or oven, can be utilized. However, as the permissible error limits become more stringent, the need arises for better temperature control, which control, it has been found, may be obtained through the use of an additional chamber surrounding the inner chamber.

A multistage chamber, or oven, capable of temperature control within less than a hundredth of a degree per one hundred degrees change in ambient temperatures is shown, for example, in United States Patent Number 2,973,420.

While ovens have been developed that are capable of maintaining a constant temperature within stringent limits, as brought out hereinabove, the constant temperature in such as oven must, however, be at least as high as the highest ambient temperatures expected since the only control exerted is by heating.

It is therefore an object of this invention to provide a temperature compensated chamber capable of maintaining temperature within the chamber constant which temperature may either be above or below expected environmental temperatures.

More particularly, it is an object of this invention to provide a temperature compensated multichamber device that may be either heated or cooled as required in order to maintain the temperature of the inner chamber within stringent limits.

Still more particularly, it is an object of this invention to provide a temperature compensated multichamber device that utilizes thermoelectric cooling means whereby the temperature within the inner chamber may be maintained below environmental temperatures, if desired.

By utilizing a thermoelectric cooling device, it has been found that the resulting structure is more compact and reliable than heretofore known oven devices. It is therefore another object of this invention to provide a temperature compensated chamber that is highly compact and yet reliable.

It has been found that aging of a crystal also affects the output frequency. It has also been found that if a crystal is maintained at elevated temperatures, aging occurs at a more rapid rate than does comparable aging where the temperatures are maintained relatively low, hence the provision of means for stabilizing temperature at a relatively low operational temperature is desirable.

Where temperature must be controlled within very stringent limits, such as, for example, for a crystal oscillator when used in a frequency standard to calibrate narow frequency range control communications system, it is not uncommon to require that the output frequency vary no more than one part in $10^8$ over a considerable period of time. Thus, if an oven is capable of maintaining the ouput frequency of an oscillator within one part in $10^8$ for 60 days at elevated temperatures, for example, a temperature compensating device capable of maintaining the temperature at a reduced level (such as 30° centigrade) could greatly lengthen this period of time.

It is therefore another object of this invention to provide a temperature compensated multichamber device capable of maintaining the output frequency of a crystal oscillator constant for long periods of time by decreasing aging of the crystal through maintenance of the crystal at a relatively low temperature.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which.

Figure 1:
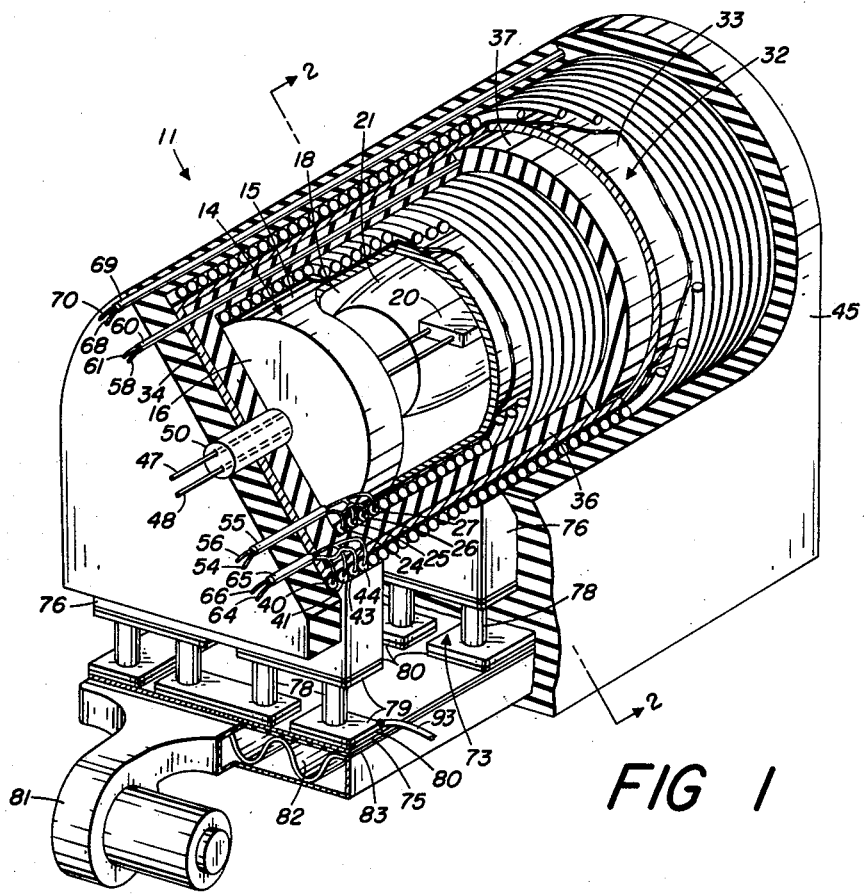
FIGURE 1 is a perspective view of the temperature compensating chamber of this invention with portions cut away for illustrative purposes.

Referring now to the drawings in which like numerals have been used for like characters throughout, the numeral 11 refers generally to the temperature compensated multichamber device of this invention.

Figure 2:
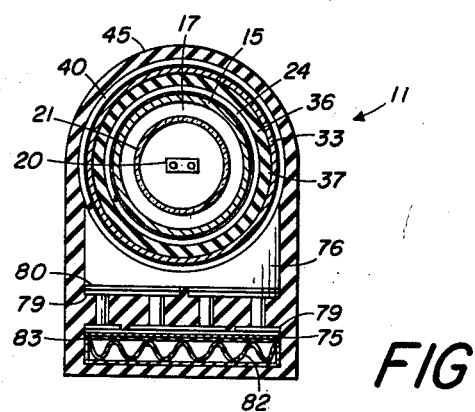
FIGURE 2 is an end section view taken through the lines 2—2 of FIGURE 1.

As shown in FIGURES 1 and 2, a metallic can 14 of copper, for example, has a cylindrical side wall 15, front end wall 16 and rear end wall 17. Walls 15-17 define an inner chamber 18 to be maintained at constant temperature. The component, or element, to be maintained at a constant temperature is normally placed in the inner chamber 18, and, as shown in FIGURES 1 and 2, may be a crystal 20. As is conventional, crystal 20 may be contained within a glass envelope 21.

Figure 4:
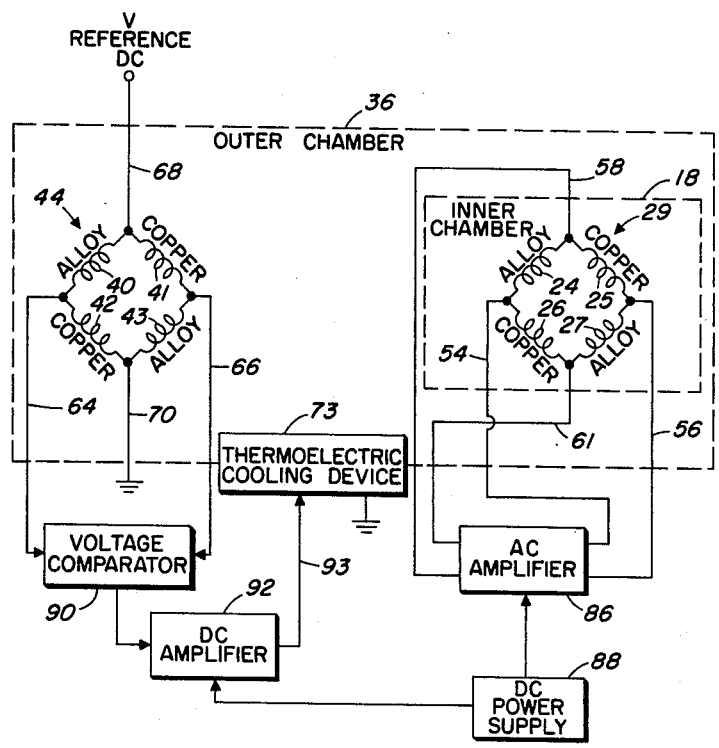
FIGURE 4 is a schematic and block diagram illustrating the temperature control system utilized in the temperature compensated chamber of FIGURE 1.

As shown best in FIGURE 1, a plurality of coils 24, 25, 26, 27 are wound about cylindrical side wall 15. These coils are connected in the form of a bridge circuit 29, as shown in FIGURE 4, for sensing temperature deviations within inner chamber 18 and for heating the same when necessary, as will be brought out more fully hereinafter.

As shown in FIGURES 1 and 2, can 14 is contained within can 32, which can has a cylindrical side wall 33, front end wall 34, and a rear end wall (not shown). Can 32, like can 14, is metallic and is maintained spaced with respect to can 14, and the area between the cans constitutes an outer chamber 36. As shown by FIGURES 1 and 2, chamber 36 may be completely filled by a layer of thermal insulating material 37 (except for the area occupied by coils 24–27 around on the outside of side wall 15). Insulating layer 37 may be of conventional material, and may, for example, be polyurethane foam.

As shown in FIGURE 1, side wall 33 also has a plurality of coils 40, 41, 42 and 43, forming bridge circuit 44 (see FIGURE 4), wound thereon. Bridge circuit 44 senses deviations in temperature in outer chamber 36, as will be brought out more fully hereinafter.

Can 32 is covered by an insulating layer 45, which layer may be of material identical to that of layer 37. A pair of leads 47 and 48 are connected to crystal 20 through a plug, or conduit 50, which plug extends through front end walls 16 and 24 of inner can 14 and outer can 32, respectively, and the insulating layers. Plug 50 seals the unit in a manner well known in the art.

Coils 24 through 27, forming bridge circuit 29, may be wound on side wall 15, as shown in FIGURE 1, with the windings adjacent to one another but, of course, electrically insulated from one another and from side wall 15 in conventional manner. Windings 25 and 26 are preferably copper, while windings 24 and 27 are preferably made of an alloy having temperature responsive properties unlike copper. Such an alloy that is usable, for example, may exhibit an ohmic value change of about 0.6% per degree centigrade. Bridge circuit 44, consisting of coils 40 through 43, may be identical to bridge circuit 29, and may have windings 41 and 42 of copper and windings 40 and 43 of alloy.

As shown in FIGURE 1, a lead 54 is connected to one end of windings 24 and 26 of bridge circuit 29 through plug, or conduit 55, while a second lead 56 is connected to windings 25 and 27 through plug 55. Lead 58 is likewise connected to the free ends of windings 24 and 25 (as indicated in FIGURE 4) through a long conduit, or plug 60, which plug extends through the outer thermal insulation layer 37 to, and through, the back end walls of cans 14 and 32, while lead 61 is connected to the free ends of windings 26 and 27 through the same plug.

Windings 40 through 43 of bridge circuit 44 are connected in a similar manner. Lead 64 is connected to one end of windings 40 and 42 through plug 65, while lead 66 is connected to one end of leads 41 and 43 through the same plug (which plug, as shown in FIGURE 1, need only pass through end wall 34 and outer insulation layer 45). Lead 68 is connected to the free end of windings 40 and 41 (as indicated in FIGURE 4) through long plug or conduit 69, while lead 70 is connected to the free ends of windings 42 and 43 through the same plug (which plug extends along the outer insulation layer to the rear wall of can 32 and through the same).

Figure 3:
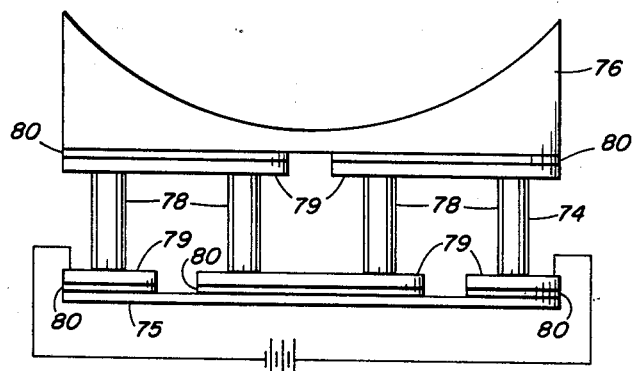
FIGURE 3 shows a typical thermoelectric cooling unit.

It is a feature of this invention that the outer can 32 and hence outer chamber 36 may be cooled as desired. For this purpose, a thermoelectric cooling device 73 is provided. As shown in FIGURES 1, 2 and 3, and as is conventional, thermoelectric cooling device 73 may consist of a plurality of units 74, each of which has a hot junction 75 and a cold junction 76. These junctions may be aluminum plates and the cold junction may be formed in such a manner (as shown best in FIGURE 3) so as to snugly receive outer cylinder 33 with the windings 40 through 43 thereon.

As is conventional, the hot and cold junctions are separated by cylinders 78 alternately of dissimilar metal connected conventionally in a series circuit by copper contacts 79 to provide maximum electrical resistance for the device. The copper contacts may be fastened to the aluminum plates conventionally, such as bonding with cement, for example, so that the aluminum plates are electrically insulated from the copper contacts, by thin electrical insulating layer 80. Cylinders 78 are preferably made of bismuth telluride ($Bi_2Te_3$) and arranged so that a quantity of heat will be absorbed at the cold junctions and generated at the hot junctions (Peltier effect) when a D.C. voltage is supplied. A device exhibiting this effect is shown and described, for example, in United States Patent No. 2,984,077.

A blower 81 is provided to circulate air through a heat sink 82, which heat sink is contiguous to hot junction 75 of thermoelectric cooling unit, though electrically insulated therefrom by thin electrical insulating layer 83.

As shown in FIGURE 1, outer thermal insulating coating 45 is utilized to cover the entire unit (with the exception of the blower and its conduit) including outer can 32 and the thermoelectric units 74.

As shown in FIGURE 4, the windings of each bridge circuit are connected to provide automatic temperature compensation. Windings 54 and 56 are connected to the input side of a conventional A.C. amplifier 86, while windings 58 and 61 are connected to the output side of amplifier 86. As is conventional, A.C. amplifier 86 may be energized from a D.C. power supply source 88.

Windings 64 and 66 of bridge circuit 44 are connected to a conventional voltage comparator 90, the output of which is coupled through a conventional D.C. amplifier 92 and lead 93 to thermoelectric cooling device 73. As is conventional, D.C. amplifier 92 may be energized from the D.C. power source 88. The remaining two windings (windings 68 and 70 of bridge circuit 44) are connected to a D.C. reference voltage and to ground, respectively.

It is the purpose of the multichamber device of this invention to stabilize and maintain the temperature within the inner chamber constant, preferably at a low temperature.

Figure 5:
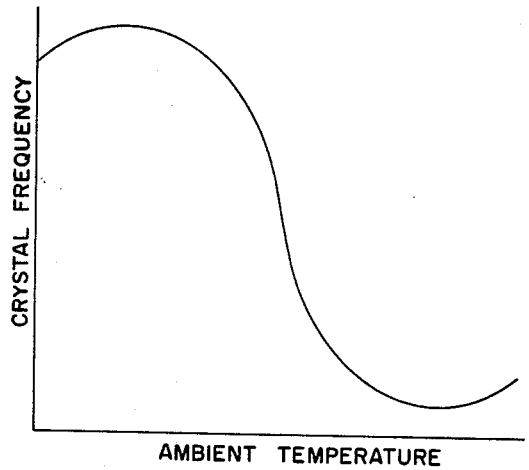
FIGURE 5 is a graph illustrating typically the output frequency of a crystal as affected by temperature changes.
Figure 6:
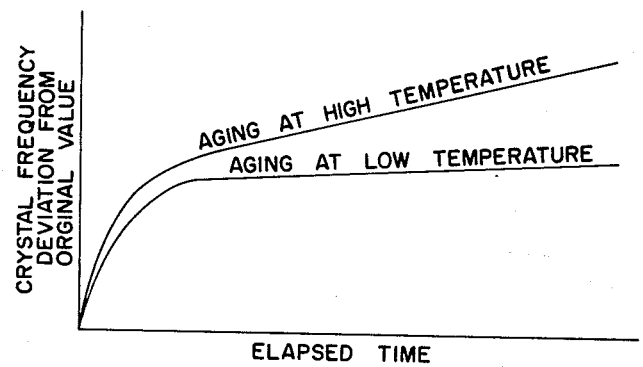
FIGURE 6 is a graph illustrating the effect of crystal aging on frequency devitations of the oscillator for different operational temperatures.

As shown by the graph of FIGURE 5, crystal frequency deviates (characteristically in an S curve) over a range of temperatures. If the temperature is maintained at a constant value, however, the crystal frequency will no longer be subject to variations due to temperature fluctuations. In addition, and as shown by the graph of FIGURE 6, and as brought out hereinabove, frequency deviations due to aging of the crystal are improved considerably by maintaining the crystal at a relatively low temperature.

In operation then, the stabilizing temperature chosen is preferably relatively low. The windings of bridge circuit 29 are chosen so that the bridge will be balanced at the predetermined temperature, for example 30° centigrade. If the temperature should fall below 30° centigrade, an A.C. error signal will be sent through the amplifier to the windings of the bridge circuit, which also serve as a heater, to heat the inner chamber to 30° centigrade, at which time the bridge would again be balanced.

To assure that the inner chamber will be maintained constant at the predetermined temperature, the outer chamber must be cooled to a temperature at least as low as the predetermined temperature of the inner chamber, for example 30° centigrade. As a matter of practice, however, it is usually held a few degrees lower. Cooling is provided by the thermoelectric cooling device 73, which device is energized through voltage comparator 90. As is well known in the art, when direct current is caused to flow through the cooling device in the proper direction, heat is removed from the vicinity of the cold junction. Thus, the outer chamber 36 is cooled by the thermoelectric cooling device.

The windings of bridge circuit 44 selected so that the voltage comparator will develop zero voltage (bridge in balance) only at a preselected temperature to indicate that the thermoelectric cooling unit need take no more heat from the outer chamber. As can be readily appreciated, ambient, or environmental, temperatures outside the outer chamber may be, for example, at any higher temperature so long as the thermoelectric cooling device has the capability to pull the temperature at least to the predetermined temperature of the inner chamber.

If desired, the thermoelectric cooling device need not have a control system associated therewith and could be constantly operated to pull the temperature below the predetermined temperature of the inner oven. This would mean, of course, that the heating coils of the inner oven might have to steadily heat the coils and possibly would have to supply a great deal of heat if very low temperatures existed in the outer chamber.

From the foregoing, it should be evident to those skilled in the art that the temperature compensated multichamber device of this invention is particularly well suited for reliably maintaining a constant temperature that can be either above or below environmental temperatures.

What is claimed as our invention is:

1. A compact multichamber device having an automatic temperature control, said device comprising: first wall means defining a first enclosed chamber; means including a sensing and heating coil contiguous to said first wall means to sense temperature deviations from a preselected temperature value within said first chamber and responsive thereto heating said first chamber; second wall means surrounding said first chamber and defining a second enclosed chamber; and means including a thermoelectric cooling device contiguous to said second wall means for cooling said second chamber to a temperature at least as low as, said preselected temperature whereby the temperature within said first enclosed chamber is maintained constant even though environmental temperatures outside said second enclosed chamber are higher than said preselected temperature value.

2. An automatically temperature controlled and compact multichamber device, comprising: a first cylinder closed at both ends; a second cylinder of larger diameter than the first and substantially concentrically positioned with respect thereto, said second cylinder being closed at both ends; sensing and heating means including a bridge circuit adjacent legs of which are dissimilarly affected by temperature changes whereby said bridge is unbalanced and produces an error signal whenever the temperature within said first cylinder deviates from said predetermined temperature value, said error signal causing said first cylinder to be heated whenever there is deviation in said temperature to thereby eliminate said error signal; cooling means including a thermoelectric cooling device; and electrical circuit means for sensing the temperature within said second cylinder and causing said thermoelectric cooling device to lower the temperature in said second cylinder if above a preselected temperature at least as low as the predetermined temperature value to be maintained within said first cylinder.

References Cited in the file of this patent
UNITED STATES PATENTS

| | | |
|---|---|---|
| 1,940,599 | Morrison | Dec. 19, 1933 |
| 1,967,185 | Clapp | July 17, 1934 |
| 2,952,786 | Lewis | Sept. 13, 1960 |
| 2,955,185 | Cox | Oct. 4, 1960 |
| 2,998,707 | Meess et al. | Sept. 5, 1961 |

FOREIGN PATENTS

| | | |
|---|---|---|
| 144,669 | Great Britain | Sept. 9, 1921 |